April 11, 1944.　　　O. A. SCHMITT　　　2,346,511
CAN BODY FEEDING MEANS
Filed Oct. 9, 1941　　　7 Sheets-Sheet 1

INVENTOR
Otto A. Schmitt
Mason & Porter
ATTORNEYS

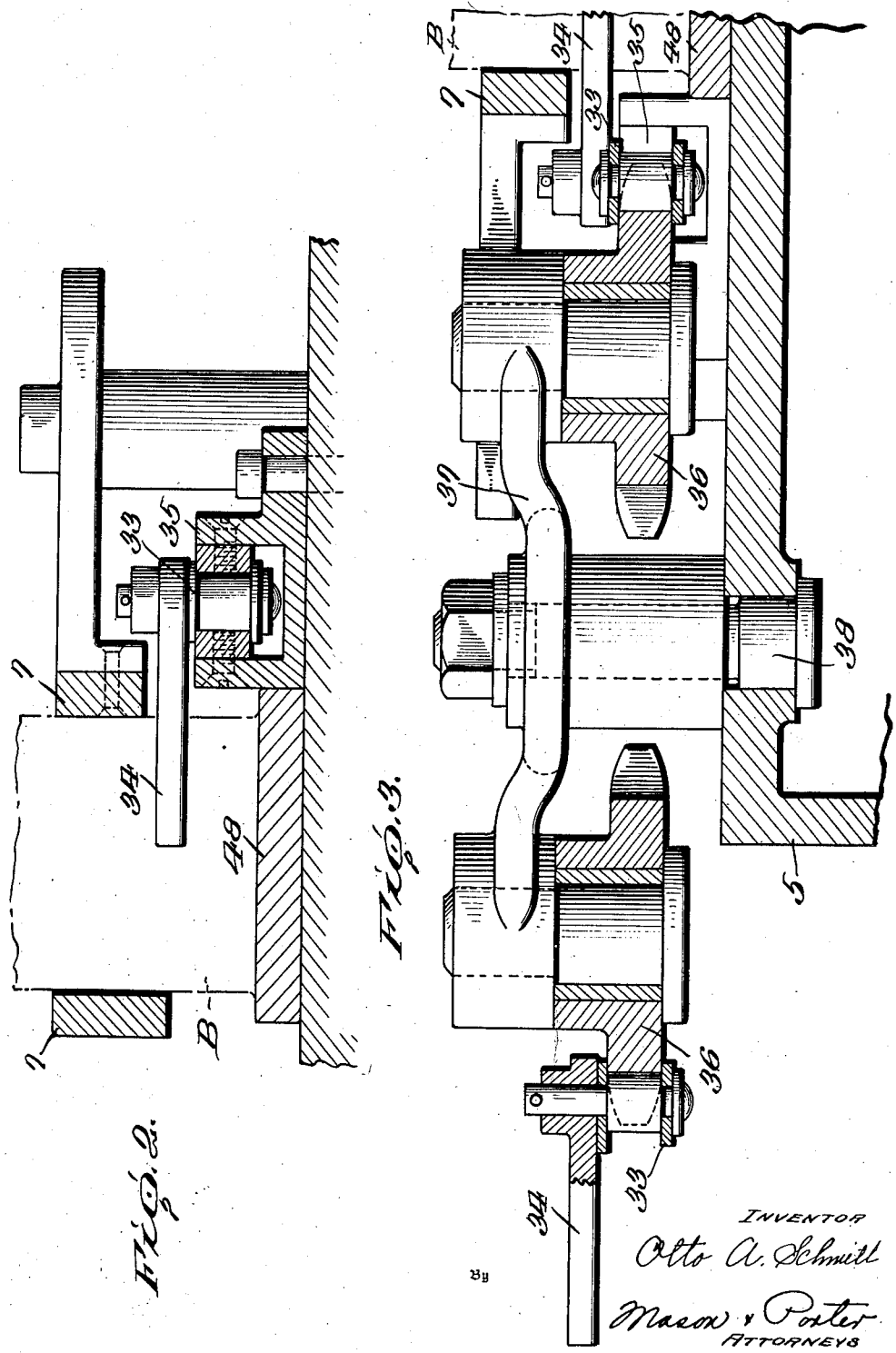

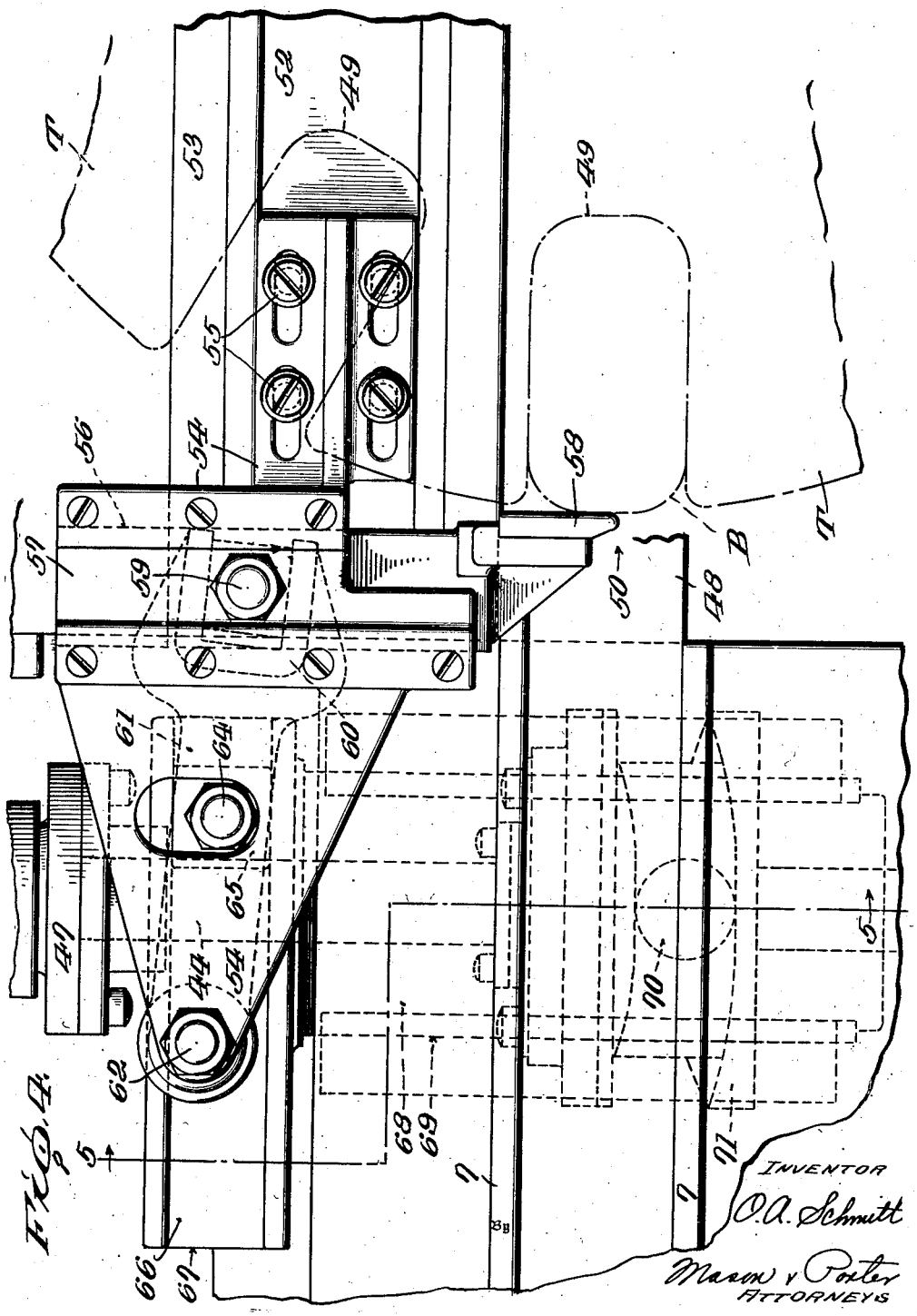

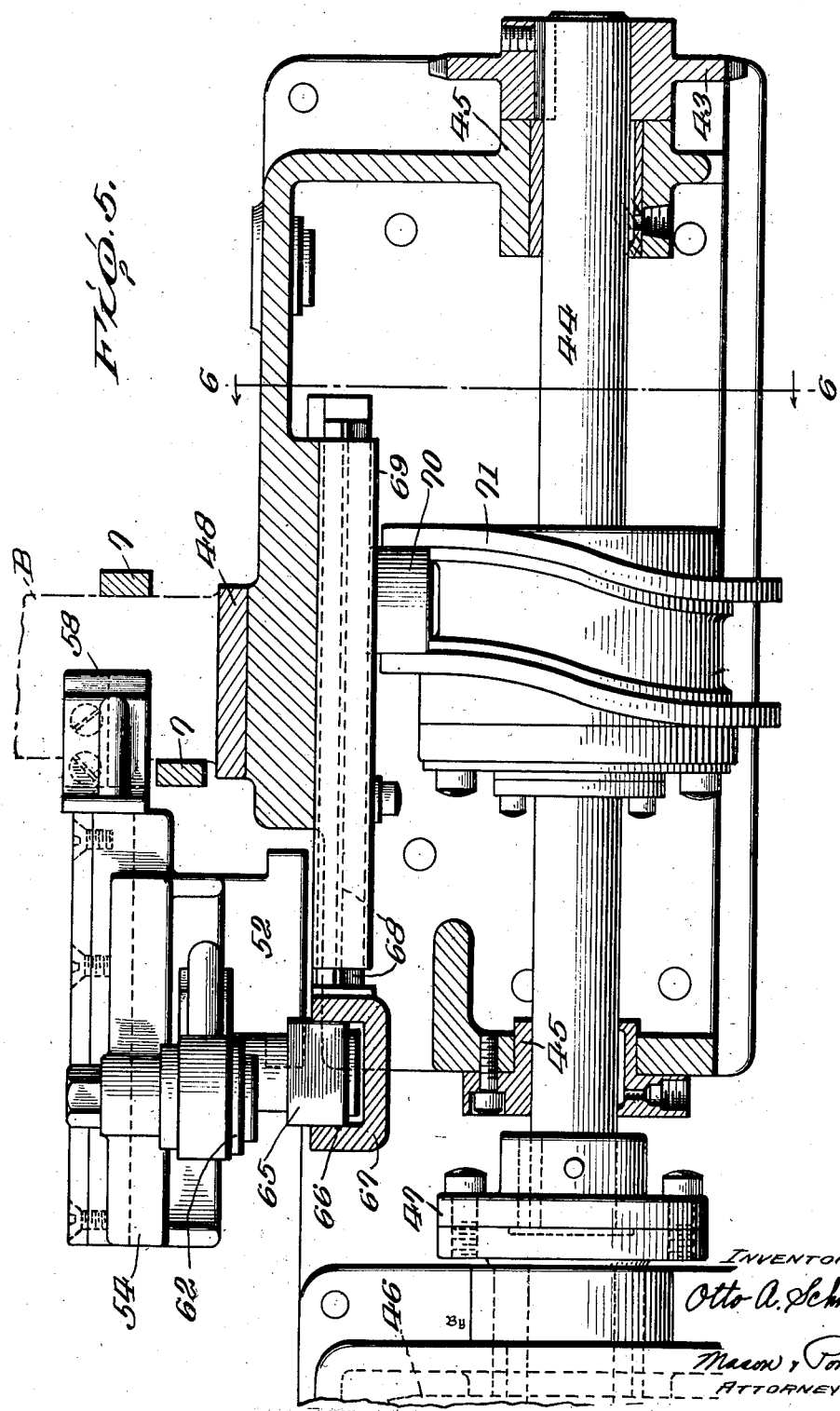

April 11, 1944.   O. A. SCHMITT   2,346,511
CAN BODY FEEDING MEANS
Filed Oct. 9, 1941   7 Sheets-Sheet 5
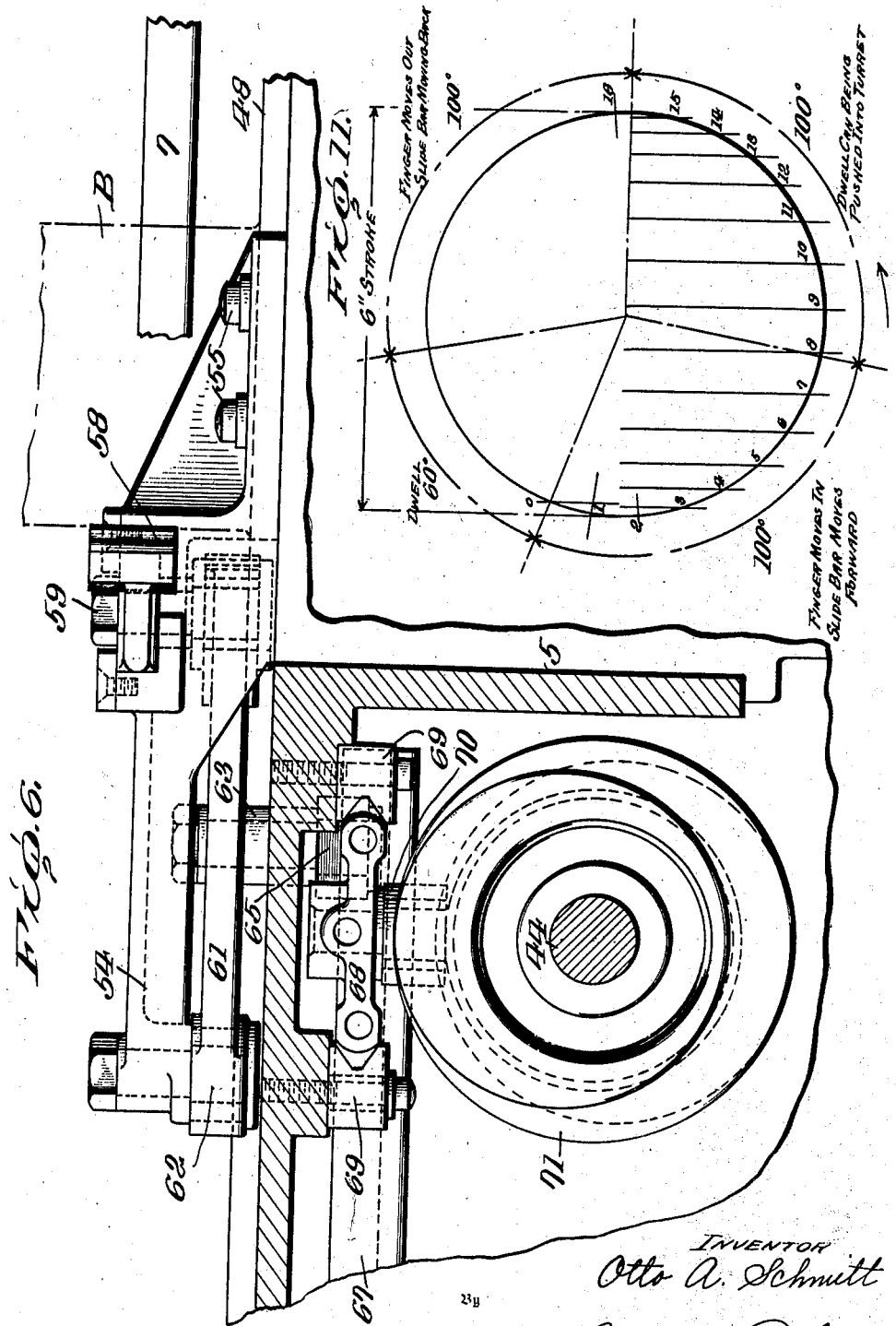
INVENTOR
Otto A. Schmitt
Mason & Porter
ATTORNEYS April 11, 1944.  O. A. SCHMITT  2,346,511
CAN BODY FEEDING MEANS
Filed Oct. 9, 1941  7 Sheets-Sheet 6
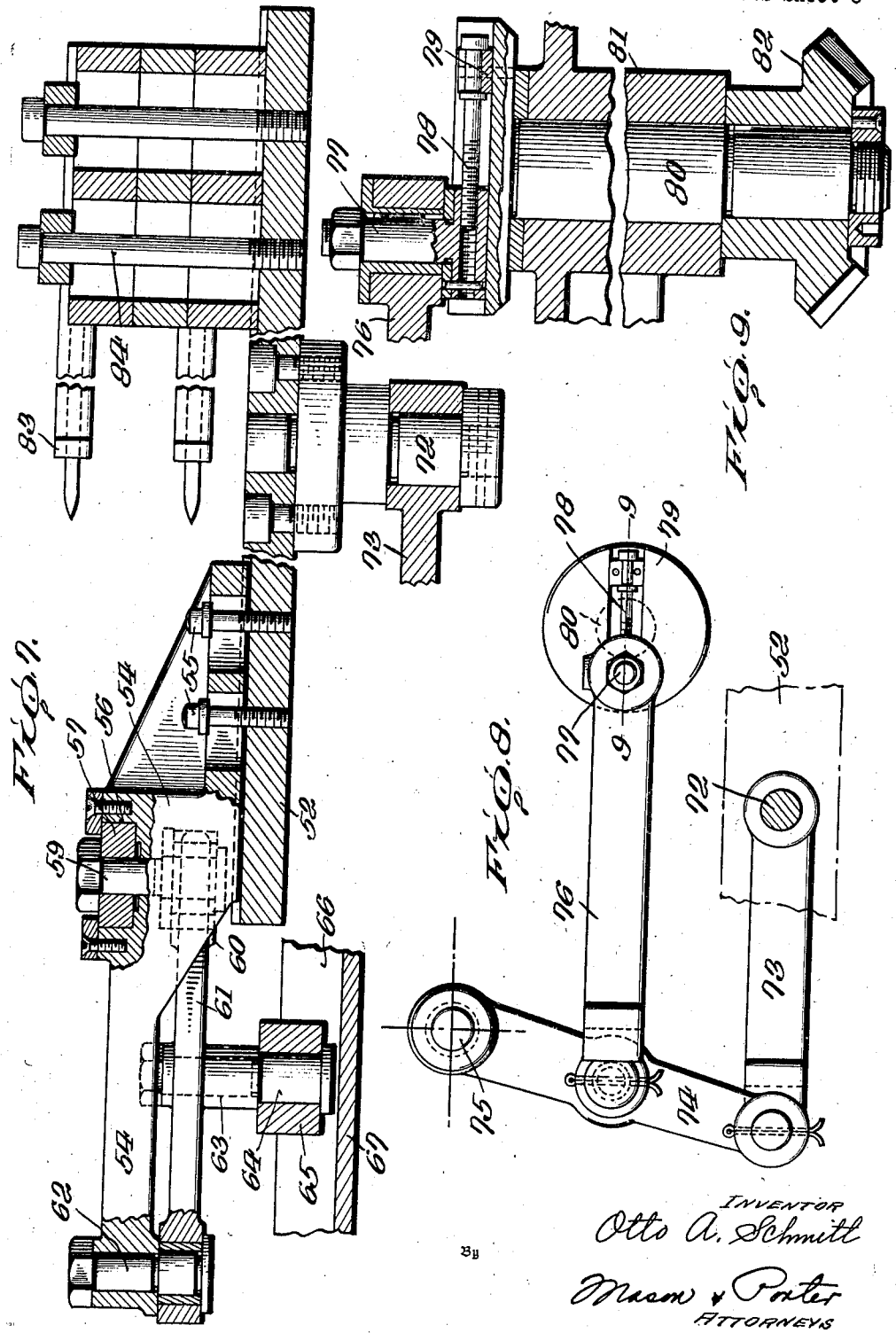
INVENTOR
Otto A. Schmitt
By
Mason & Porter
ATTORNEYS

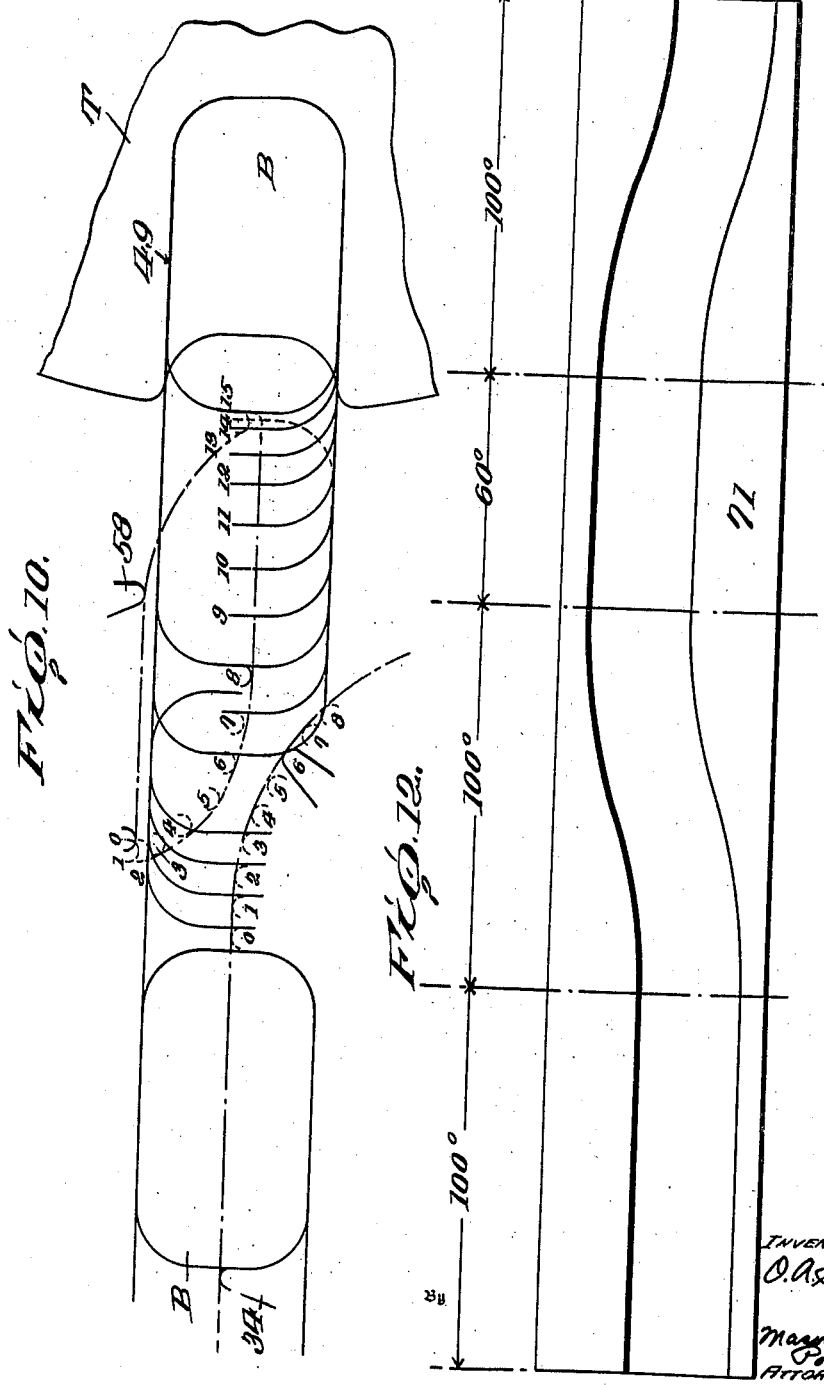

Patented Apr. 11, 1944

2,346,511

UNITED STATES PATENT OFFICE 2,346,511

CAN BODY FEEDING MEANS

Otto A. Schmitt, Syracuse, N. Y., assignor to Continental Can Company, Inc., New York, N. Y., a corporation of New York Application October 9, 1941, Serial No. 414,385

12 Claims. (Cl. 198—24)

The invention relates generally to work feeders and primarily seeks to provide a novel means for feeding cam bodies into the rectiving pockets in turret structures embodied in can body packing, closing or like machines.

Many forms of cam body feed-in mechanisms have been devised for feeding the can bodies into machines of the character mentioned, but it is true also that many of these feed-in mechanisms have been found objectionable because of the complicated nature thereof, the angular paths through which the can bodies necessarily were introduced into the machines, and the probabilities of damaging the can bodies or the decorative surface coatings thereon by reason of dragging contact of feeding elements therewith.

It is, therefore, an object of the present invention to provide a novel and simple can body feed-in means capable of feeding the can bodies into the serially presented turret pockets in a straight line path and without any dragging element contact likely to damage the can bodies or any decorative markings thereon.

Another object of the invention is to provide a feed-in means of the character stated in which the can bodies are fed toward the turret in equidistantly spaced relation by a conveyor having feeder fingers or lugs thereon which turn out of the path of movement of the can bodies before they reach the turret, and in which the actual feeding of the can bodies into the turret pockets is effected by a reciprocating pusher which moves into and out of the path of movement of the can bodies.

Another object of the invention is to provide in a can body feed-in means of the character stated a reciprocating pusher element and novel means for imparting four-motion feeding movements thereto to cause it to move in between two can bodies, engage behind the foremost thereof in straight line non-dragging contact effective to move the same to and the full distance into the then presented turret pocket, then out of the path of travel of the can bodies, again without dragging contact, and then back to the starting point.

Another object of the invention is to provide a feed-in means of the character stated wherein there is included a block chain conveyor or its mechanical equivalent for feeding can bodies along in abutting relation, means for intercepting the can bodies on said conveyor and movable to permit movement away of the can bodies one by one in spaced relation for being engaged by the hereinbefore mentioned feed fingers or lugs and conveyed thereby to the four-motion feeder element in equidistantly spaced relation.

Another object of the invention is to provide a can body feed-in means of the character stated wherein a part of the means for imparting the four-motion feeding movements to the four-motion feeder element comprises a reciprocatory motion feeder element comprises a reciprocatory bar which supports said element at one end and which is equipped at its other end with means for stripping a can body from a turret pocket simultaneously with the placement of a can body in a turret pocket by said element.

With the above and other objects in view that will hereinafter appear, the nature of the invention will be more fully understood by following the detailed description, the appended claims, and the several views illustrated in the accompanying drawings.

In the drawings:

Figure 2 is a fragmentary vertical cross section taken on the line 2—2 on Figure 1.

Figure 3 is a fragmentary vertical cross section taken on the line 3—3 on Figure 1.

Figure 4 is an enlarged plan view illustrating the four-motion feed element and the cooperating carrying and actuating devices.

Figure 5 is a fragmentary vertical cross section taken on the line 5—5 on Figure 4.

Figure 6 is a fragmentary vertical cross section taken on the line 6—6 on Figure 5.

Figure 7 is a fragmentary longitudinal sectional view illustrating the slide bar and its connections.

Figure 8 is a detail plan view illustrating the slide bar reciprocating means.

Figure 9 is a detail vertical section taken on the line 9—9 on Figure 8.

Figure 10 is a diagrammatic view illustrating the path of movement of the four-motion feed element and a plurality of progressive stages in the advancement of a can body into a receiving pocket of the turret structure.

Figure 11 is a diagrammatic view illustrating the movement cycle of the slide bar corresponding with the feeder element cycle illustrated in Figure 10.

Figure 12 is a diagrammatic development of the slide actuator cam groove.

Figure 1:
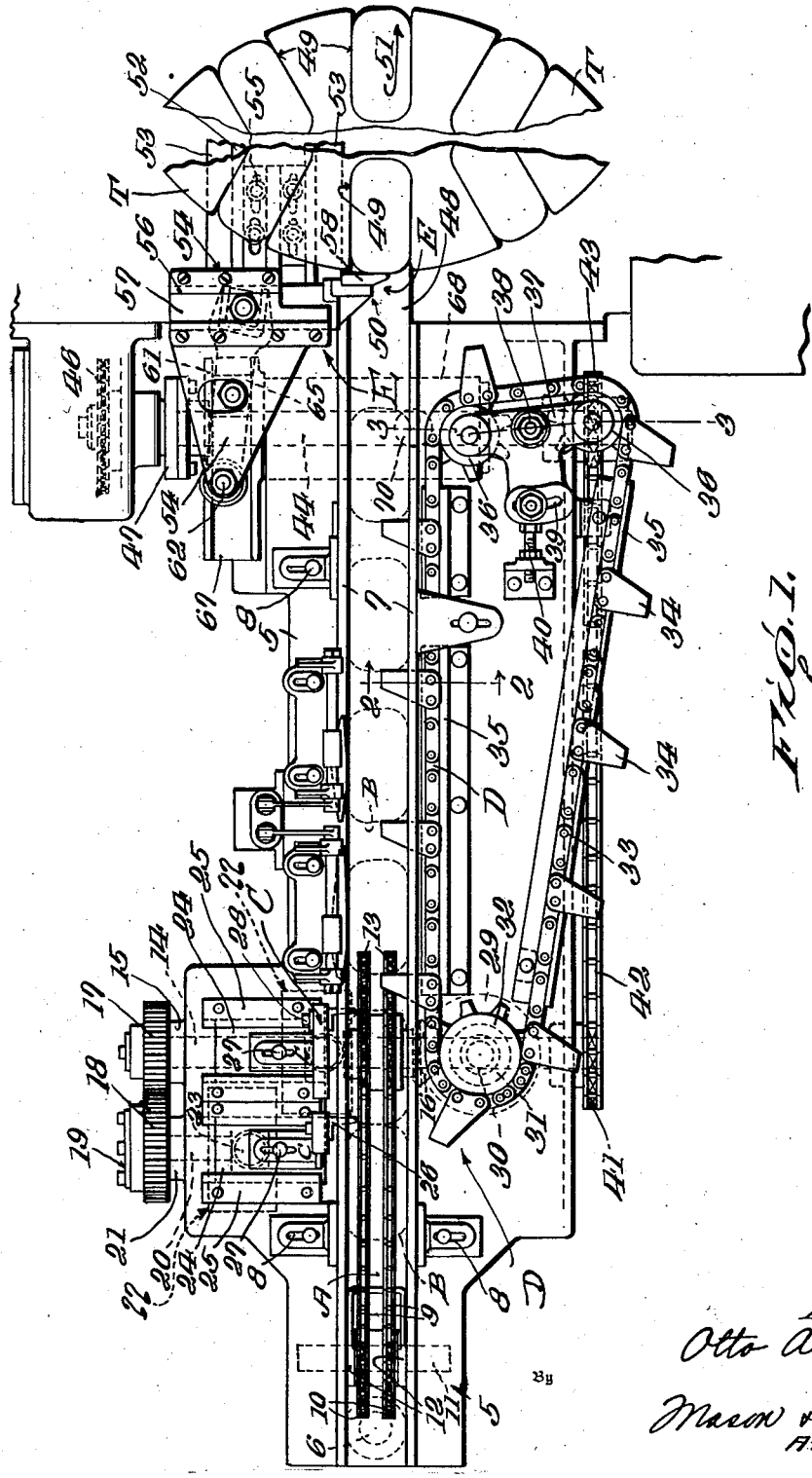
Figure 1 is a plan view illustrating the invention.

In the example of embodiment of the invention herein illustrated, there is included a conveyor means A for continuously feeding can bodies B toward the turret structure T. A can body intercepting and timing means generally designated C serves to intercept can bodies B in abutting relation on the conveyor A and to intermittently release said can bodies so as to permit them to move one by one, in spaced relation, toward the turret structure T. The can bodies thus timed by the means generally designated C are engaged by a second conveyor, generally designated D, which serves to feed the can bodies in equidistantly spaced relation to a point adjacent to but spaced from the turret structure T. The can bodies B thus fed toward the turret structure T in equidistantly spaced relation are engaged by a four-motion feeder equipment generally designated E which serves to feed them, positively, into the receiving pockets presented serially at the can body receiving station.

The mechanism herein disclosed as an example of embodiment of the invention will now be described in detail, and it should be understood that the can bodies B are fed to the receiving end of the apparatus by an appropriate feed-in means (not shown). The cooperating equipments herein generally referred to are mounted in cooperative relation above a feed table frame 5 which is supported at its delivery end on the main machine frame and at its receiving end on a suitable supporting standard equipment 6.

Can bodies entering the apparatus are moved along between a pair of parallel, spaced guide rails 7 which are adjustably secured, as at 8, on the frame table 5. The conveyor A comprises a pair of block chains 9 which have non-positive engagement with the under surface of the can bodies. The block chains, or any equivalent conveyor structure, pass over sprockets 10 mounted at the receiving end of the frame on shaft 11 having rotative bearing, as at 12, on the frame 5. At their delivery ends, the chains pass over larger sprockets 13 which are mounted on a shaft 14 having rotative bearing, as at 15, in the frame 5.

The shaft 14 also carries a bevel pinion 16 and has a spur gear 17 keyed at one end thereof which meshes with a similar spur gear 18 adjustably secured, as at 19, on a shaft 20 rotatable in parallel relation to the shaft 14 in bearings 21 provided therefor in the frame 5.

The shafts 14 and 20 comprise a part of the intercepting and timing means C, and each carries a grooved cam 22 into the groove of which depends a roller 23 from a slide 24 which is transversely slidable in a slideway 25 provided therefor on the frame 5. Each of the slides 24 carries an intercepting or timing finger 26 which is laterally-adjustably mounted, as at 27, on the respective slide. Each finger 26 is longitudinally-adjustably mounted as at 28.

The bevel pinion 16 meshes with and drives a bevel gear 29 secured upon a shaft 30 which is rotatable in a vertical bearing 31 provided therefor on the frame 5. The shaft 30 also carries a sprocket 32 which is affixed thereon and forms a part of the second conveyor equipment D hereinbefore referred to. The second conveyor chain 33 passes about the sprocket 32 in a horizontal plane and is equipped with equidistantly spaced feeder lugs 34. Each run of the chain is supported in a suitable guide 35, and at its delivery end the chain 33 passes over two idler pulleys 36 mounted at the transversely spaced ends of a carrier 37. The carrier 37 is slidably-pivoted on the frame 5, as at 38, and is swingably-adjustable, as at 39, for permitting adjustment of the timing or delivery point of the chain, and longitudinally-adjustable, as at 40, so as to enable tightening of the chain.

The shaft 14 also carries a sprocket 41 over which passes a driver chain 42, said chain also passing over a sprocket 43 on a cross shaft 44 rotatable in the frame bearings 45 and equipped with a driver sprocket 46 adjustably secured thereon, as at 47, and to which rotation is imparted from any approved drive source (not shown.)

While being moved toward the turret structure T by the second or chain conveyor 33, can bodies B are moved over a rail or supporting track 48. It is to be understood that the turret structure T herein referred to may comprise a single turret which is indexed step-by-step to present its peripheral pockets 49 serially at the can body receiving and discharging stations, or it may comprise a plurality of such pocketed turrets. It is desirable, however, that the turret or turrets be so formed and arranged that each receiving pocket 49 presented at the receiving station will be lined up with a pocket at that time presented at the discharging station. The receiving station is herein generally designated 50, and the discharging station is herein generally designated 51.

The four-motion feed equipment will now be described. This equipment includes a slide bar 52 which is reciprocable in slide guides 53 provided therefor in the machine framing and disposed so as to guide reciprocations of the bar in a path paralleling the straight line feed path followed by the can bodies in moving toward and into the receiving pockets of the turret structure T.

A bracket 54 is affixed, as at 55, to one end of the slide bar 52, and this bracket is equipped with a lateral or transversely disposed slideway 56 in which a feeder slide 57 is transversely slidable. The slide 57 carries the four-motion feeder element 58 and has a driver pin 59 depending therefrom. The pin 59 is straddled by the forked end 60 of a lever 61, the other end of said lever being pivoted, as at 62, to the bracket 54.

The lever 61 is provided intermediately of its ends with a bearing 63 in which a pin 64 is freely supported. The pin 64 depends beneath the lever 61 and carries a block 65 which is slidable in a longitudinal grooveway 66 formed in the head end projection 67 of a second transverse slide 68. It will be observed that the grooveway 66 parallels the straight line feed path followed by the can bodies B in their movements into the turret pockets, whereas the slide 68 is disposed in parallel relation to the slide 57 previously referred to.

The slide 68 is transversely slidable in guideways 69 supported by the frame 5 and it has a roller 70 depending therefrom for engagement in the actuator grooveway in a grooved cam 71 which is secured to the shaft 44. A driver pin 72 depends from the slide 52 and is connected to one end of a driver link 73 which has its other end connected to one end of a driver arm 74 pivoted, as at 75, to the frame and connected intermediate its ends with a thrust link 76. The link 76 is connected at its other end to a crank pin 77 adjustably mounted, as at 78, to project eccentrically from a driver disk 79. The disk 79 is secured upon a shaft 80 which is rotatable in a frame bearing 81. Rotation is imparted to the shaft 80 through a driver bevel gear 82 from any suitable driving source (not shown). It is to be understood that the shaft 80 is rotated once for each can body feeding movement and is driven in timed relation with the remainder of the operating connections hereinbefore referred to.

It is preferred that the slide bar 52 be equipped at its end remote from the bucket 54 with stripper or can body discharging fingers 83, said fingers being adjustably secured on said bar as at 84.

In the operation of the invention the can bodies are fed into the apparatus in abutting relation and are so received on the block chains 9 as illustrated in Figure 1. Can bodies being fed along by the non-positive driving block chains are intercepted and stopped by the timing fingers 26 which are independently moved by the grooved control cams 22 so that the intercepted can bodies will be released one-by-one for movement in spaced relation along the chains 9 toward the turret structure T.

Each can body B thus separated from the abutting can bodies is picked up by one of the feeder lugs 34 on the chain 33, and the can bodies are thus carried along in equidistantly spaced relation over the rail or track 48 to a point adjacent to but spaced from the turret structure. At this point, or in other words, at the feed-in or receiving station 50 the four-motion feeding equipment takes over the feeding function and positively feeds the can bodies into the serially presented turret pockets 49.

It will be obvious that the straight line movement of the slide 52 causes the pusher finger or four-motion feed element 58 to move back and forth in the general direction of movement of the path of travel of the can bodies. It will also be obvious that the lateral or transverse reciprocation of the slide 68 will cause the lever 61 to swing about the bracket pivot 62 so as to impart lateral or transverse reciprocation to the slide 57 which carries the four-motion feeder elements 58. This compounded movement causes the element 58 to receive a four-motion feed movement in a horizontal plane, the initial feeding movement being forwardly and inwardly behind a can body being moved toward the turret by one of the chain lugs 34, then a straight line movement in the path of travel of the can body and effective to move a can body positively into the then presented receiving bracket, and this effective movement of the element is followed by a retraction thereof initiated by an outward and rearward movement out of contact with the can body and then a straight line movement to one side of and paralleling the path of travel of the can bodies and back to the initial positions.

The relation of the effective chain lug 34 and the four-motion feeder element 58 during one of the four-motion feed phases is illustrated diagrammatically in Figure 10 of the drawings. In Figure 10 the path of travel of the chain lug 34 and the four-motion feeder element 58 is diagrammatically illustrated, and by comparing the successive positions of the moving can body, the chain lug 34 and the four-motion feeder element as indicated in this particular figure by successive numeral indications commencing at zero, it is possible to observe just when the chain lug terminates its effective contact with the can body and when the four-motion feeder element commences and terminates its effective contact with said can body. The infeeding of the can bodies by contact of the four-motion feeder element is effected with substantially no sliding contact between said element and the can bodies such as would damage the can bodies or any decorative or protective coating thereon.

In Figure 11 of the drawings, the movement cycle of the slide bar corresponding with the feeder movements diagrammatically illustrated in Figure 10 is shown. In Figure 12 there is illustrated diagrammatically a development of the groove in the cam 71 which is effective to impart the transverse movements of the four-motion feeder element into and out of the path of travel of the can bodies.

It is, of course, to be understood that the details of structure and arrangement of parts may be variously changed and modified without departing from the spirit and scope of the invention.

I claim:

1. In apparatus of the character described, a rotary pocketed turret adapted to be moved station by station to present pockets serially at stations including a can body receiving station, means for feeding can bodies along a single straight line one by one toward and into serially presented turret pockets, said last named means comprising a power driven traveling can body feed-in conveyor for feeding can bodies in abutting relation, power actuated means reciprocable across the path of travel of the can bodies for intercepting the can bodies of the conveyor and then intermittently releasing them one by one to move in spaced relation toward the turret, and conveying means including a four-motion feeder element engageable with the spaced can bodies for moving them individually into the serially presented turret pockets.

2. In can body feeding apparatus for feeding can bodies along a single straight line one by one toward and into serially presented turret pockets, a can body feed-in conveyor for feeding can bodies in abutting relation, means for intercepting the can bodies on the conveyor and then intermittently releasing them one by one to move in spaced relation toward the turret, a second conveyor for moving the can bodies in equidistantly spaced relation to a point adjacent to but spaced from the turret, and a four-motion feeder element engageable with the spaced can bodies for moving them individually into the serially presented turret pockets.

3. In can body feeding apparatus for feeding can bodies along a single straight line one by one toward and into serially presented turret pockets, a can body feed-in conveyor having non-positive engagement with can bodies for feeding them in abutting relation, means for intercepting the can bodies on the conveyor and then intermittently releasing them one by one to move in spaced relation toward the turret, a conveyor chain movable in a horizontal plane and having equidistantly spaced lugs thereon engageable with the can bodies for moving them to a point adjacent to but spaced from the turret, and a four-motion feeder element movable in a horizontal plane engageable with the spaced can bodies for moving them individually into the serially presented turret pockets.

4. In can body feeding apparatus for feeding can bodies one by one into serially presented turret pockets, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, the movement into said straight line path being a combined inward and forward movement, and the movement out of said straight line path being a combined outward and rearward movement.

5. In apparatus of the character described, a rotary-pocketed turret adapted to be moved station by station to present pockets serially at stations including a receiving station and a discharging station, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a reciprocating bar having means mounted thereon and engageable with can bodies presented at said discharging station for discharging said can bodies at said discharging station.

6. In can body feeding apparatus for feeding can bodies one by one into serially presented turret pockets, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a member constantly reciprocating in a path paralleling said straight line path, a bracket mounted on said member, a slide slidable transversely of said straight line path on said bracket and carrying said feeder element, a lever connected at one end to said slide and at its other end to said bracket, an actuator member projecting from the lever intermediately of its ends, and means engageable with said actuator member for moving the lever and imparting transverse reciprocations to the slide in timed relation with the reciprocations of said first mentioned member.

7. In can body feeding apparatus for feeding can bodies one by one into serially presented turret pockets, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a member constantly reciprocating in a path paralleling said straight line path, a bracket mounted on said member, a slide slidable transversely of said straight line path on said bracket and carrying said feeder element, a lever connected at one end to said slide and at its other end to said bracket, an actuator member projecting from the lever intermediately of its ends, a second transversely movable slide having a grooveway therein paralleling said straight line path and in which said actuator member engages, and means for reciprocating said second slide.

8. In can body feeding apparatus for feeding can bodies one by one into serially presented turret pockets, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a member constantly reciprocating in a path paralleling said straight line path, a bracket mounted on said member, a slide slidable transversely of said straight line path on said bracket and carrying said feeder element, a lever connected at one end to said slide and at its other end to said bracket, an actuator member projecting from the lever intermediately of its ends, a second transversely movable slide having a grooveway therein paralleling said straight line path and in which said actuator member engages, a roller depending from said second slide, and a rotary grooved cam for reciprocating said second slide.

9. In apparatus of the character described, a rotary pocketed turret adapted to be moved station by station to present pockets serially at stations including a receiving station and a discharging station, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a reciprocating bar constantly reciprocating in a path paralleling said straight line path, a bracket mounted on said reciprocating bar, a slide slidable transversely of said straight line path on said bracket and carrying said feeder element, a lever connected at one end to said slide and at its other end to said bracket, an actuator member projecting from the lever intermediately of its ends, a second transversely movable slide having a grooveway therein paralleling said straight line path and in which said actuator member engages, a roller depending from said second slide, and a rotary grooved cam for reciprocating said second slide, and said reciprocating bar having means mounted thereon and engageable with can bodies presented at said discharging station for discharging said can bodies at said discharging station.

10. In can body feeding apparatus for feeding can bodies one by one into serially presented turret pockets, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a longitudinal bar, means for reciprocating said bar in a path paralleling said straight line path, means for adjusting the length of the reciprocations imparted to said bar, a bracket mounted on said bar, a slide slidable transversely of said straight line path on said bracket and carrying said feeder element, and means for imparting transverse reciprocation to said slide in timed relation with the reciprocations of said member.

11. In can body feeding apparatus for feeding can bodies one by one into serially presented turret pockets, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a longitudinal bar, means for reciprocating said bar in a path paralleling said said straight line path, means for adjusting length of the reciprocations imparted to said bar, a bracket longitudinally-adjustably mounted on said bar, a slide slidable transversely of said straight line path on said bracket and carrying said feeder element, and means for imparting transverse reciprocation to said slide in timed relation with the reciprocations of said member.

12. In apparatus of the character described, a rotary pocketed turret adapted to be moved station by station to present pockets serially at stations including a receiving station and a discharging station, means for feeding can bodies in equidistantly spaced relation and in a straight line to a point adjacent to but spaced from the turret, and a four-motion feeder element engageable with the spaced can bodies for moving them individually into the serially presented turret pockets, and means for imparting four motions to said element to cause it to first move in between two spaced can bodies, then along the straight line path in engagement with a can body to place it positively in a turret pocket, then out of said straight line path, and then back to its initial position, said last named means including a longitudinal bar, means for reciprocating said bar in a path parallelling said straight line path, means for adjusting the length of the reciprocations imparted to said bar, a bracket longitudinally-adjustably mounted on said bar, a slide slidable transversely of said straight line path on said bracket and carrying said feeder element, means for imparting transverse reciprocation to said slide in timed relation with the reciprocations of said member, and a stripper member longitudinally-adjustably mounted on said bar and engageable with can bodies presented at said discharging station for stripping them from the turret pockets.

OTTO A. SCHMITT.